United States Patent
Hunter (10) Patent No.: US 10,482,782 B2
(45) Date of Patent: Nov. 19, 2019

(54) METHODS AND SYSTEMS FOR SELF-ASSESSMENT OF INDIVIDUAL IMAGINATION AND IDEATION

(71) Applicant: Daniel Rhodes Hunter, Cambridge, MA (US)

(72) Inventor: Daniel Rhodes Hunter, Cambridge, MA (US)

( * ) Notice: Subject to any disclaimer, the term of this patent is extended or adjusted under 35 U.S.C. 154(b) by 0 days.

(21) Appl. No.: 16/036,370

(22) Filed: Jul. 16, 2018

(65) Prior Publication Data

US 2018/0322802 A1 Nov. 8, 2018

Related U.S. Application Data

(63) Continuation of application No. 15/003,994, filed on Jan. 22, 2016, now Pat. No. 10,056,003.

(Continued)

(51) Int. Cl.
*A63F 9/24* (2006.01)
*G09B 7/02* (2006.01)

(52) U.S. Cl.
CPC ..................................... *G09B 7/02* (2013.01)

(58) Field of Classification Search
CPC ....................................................... G09B 7/02
See application file for complete search history.

(56) References Cited

U.S. PATENT DOCUMENTS

| 8,185,433 B2 | 5/2012 | Summer |
| 2002/0045154 A1 | 4/2002 | Wood |

(Continued)

FOREIGN PATENT DOCUMENTS

| JP | 2006350983 A | 12/2006 |
| WO | 2004058069 A1 | 7/2004 |

OTHER PUBLICATIONS

English Translation—Sun-Geun Baek, et al. "An Exploratory Study on the Usability of the Self-Evaluation Type Creativity Test" The Korea Journal of Educational Psycholocy, 2003, vol. 17, No. 1, pp. 187-203.

(Continued)

*Primary Examiner* — Steve Rowland
(74) *Attorney, Agent, or Firm* — Cynthia M. Gilbert; Blueshift IP, LLC (57) ABSTRACT

A method for assessing imagination includes providing, to each of a plurality of assessment subjects, at a first time, a first assessment prompt. The method includes receiving, from each of the assessment subjects, a first response to the first assessment prompt. The method includes safeguarding each of the received first responses. The method includes providing, to each of the assessment subjects, at a second time subsequent to the first time, a second assessment prompt. The method includes receiving, from each of the assessment subjects, a second response to the second assessment prompt. The method includes safeguarding each of the second responses. The method includes receiving, from each of the assessment subjects, a self-evaluation of the first response and the second response. The method includes analyzing the received responses and self-evaluations. The method includes generating a recommendation for a modification to a resource available to the plurality of assessment subjects.

3 Claims, 8 Drawing Sheets

Related U.S. Application Data (60) Provisional application No. 62/113,584, filed on Feb. 9, 2015.

(56) References Cited

U.S. PATENT DOCUMENTS

| | | | |
|---|---|---|---|
| 2003/0079236 A1 | 4/2003 | Comings | |
| 2004/0224296 A1* | 11/2004 | Carraccio | G09B 7/00 434/322 |
| 2004/0229199 A1* | 11/2004 | Ashley | G09B 7/00 434/323 |
| 2005/0026131 A1* | 2/2005 | Elzinga | G09B 5/00 434/365 |
| 2006/0029920 A1* | 2/2006 | Bruno | G09B 7/06 434/323 |
| 2007/0043267 A1 | 2/2007 | Kemp | |
| 2007/0196798 A1* | 8/2007 | Pryor | G09B 5/00 434/236 |
| 2007/0281285 A1* | 12/2007 | Jayaweera | G09B 7/02 434/156 |
| 2011/0117534 A1* | 5/2011 | Berger | G09B 7/02 434/350 |
| 2011/0151425 A1* | 6/2011 | Smith | G09B 7/00 434/350 |
| 2014/0162240 A1 | 6/2014 | Wheeler | |
| 2014/0287398 A1 | 9/2014 | Singh | |
| 2015/0302755 A1* | 10/2015 | Breck | G09B 5/12 434/362 |
| 2016/0063873 A1* | 3/2016 | Zimmer | G09B 5/02 434/353 |
| 2016/0225278 A1* | 8/2016 | Leddy | G06Q 20/10 |

OTHER PUBLICATIONS

International Search Report and Written Opinion for PCT/US2016/014659, dated May 26, 2016, 11 pages.
Supplementary European Search Report, issued by the European Patent Office dated May 14, 2018 in European patent application No. 16749577.9.
Examination Report issued by the European Patent Office dated Jan. 3, 2019 in European patent application No. 16749577.9, 6 pages.
First Office Action dated Mar. 22, 2019, in Chinese Patent Application 201680009049.0, including English translation, 20 pages.
Summons to Attend Oral Proceedings mailed on Jun. 7, 2019, in European patent application No. 16749577.9, 7 pages.

* cited by examiner

METHODS AND SYSTEMS FOR SELF-ASSESSMENT OF INDIVIDUAL IMAGINATION AND IDEATION

CROSS-REFERENCE TO RELATED APPLICATIONS

This application is a continuation of U.S. patent application Ser. No. 15/003,994, filed on Jan. 22, 2016, entitled "Methods and Systems for Self-Assessment of Individual Imagination and Ideation," which itself claims priority from U.S. Provisional Patent Application Ser. No. 62/113,584, filed on Feb. 9, 2015, entitled "Methods and Systems for Self-Assessment of Individual Imagination," each of which is hereby incorporated by reference.

BACKGROUND

The disclosure relates to assessment of imagination and ideation, the process of forming ideas or mental images. More particularly, the methods and systems described herein relate to self-assessment of individual imagination and ideation.

Many entities that offer measurements of performance (e.g., of employees or students) conventionally do so through standardized tests. Standardized tests provide valuable accountability. However, standardized tests do not provide accountability for the vital skills that lead to innovation. By way of example, there are tests that attempt to measure "creativity" but fall short of predicting the scope of an individual's imagination; divergent thinking, for example, is limited to one mode of creative thinking and a test for assessing such thinking would not address a level of imagination over time. Furthermore, divergent thinking tests have a low correlation with creative achievement. As another example, in some conventional tests, participants are asked to solve "brain teaser" problems that require "thinking outside the box"; while these tests may demonstrate mental agility, they also fall short of predicting the scope of the test taker's imagination. Such tests tend to be more a test of a participant's foreknowledge of a problem-solving technique—not measuring creativity. In a society and economy fueled by innovation and seeking creativity, imagination is the seed of innovation and the spark for creativity. However, imagination resides in the individual mind, as personal as the iris of the human eye. Imagination is typically considered fluid and unpredictable; it is considered a skill that appears to wither from disuse. Conventional systems for testing imagination follow conventional testing processes: a test is designed by an expert, administered on one day, and then evaluated by the same expert or those with a similar level of expertise. What is conventionally measured, therefore, is how well the test taker fulfills the test designer's and the test evaluator's concepts of imagination at one particular moment of time.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

In one aspect, the methods and systems described herein establish a measurement of imagination. In one embodiment, the functionality described herein allows an individual to measure her imagination and ideation over a period of time, in recognition that imagination leading to creativity is not static. In one embodiment, such an assessment of imagination works across academic disciplines, in schools, and in business. In another embodiment, the assessment of imagination is straightforward and easily implemented—comprehensible to the layman and functional for the scientist. In still another embodiment, the assessment of imagination allows an individual to take stock of her own imagination capabilities and provides an external gauge in the aggregate to inform policies, working conditions, and teaching practices. The methods and systems described herein provide such an assessment of individual imagination, one that measures imagination capacity over time, identifies growth and engages the individual in the first steps of enhancing of his or her imagination. Such an assessment may include reversing conventional testing paradigms.

In some embodiments, imagination may be assessed separately from creativity. In one such embodiment, imagination may be considered to be an internal process of envisioning a future outcome while a level of creativity is ascribed to an outcome of imagination. By way of example, an individual may have one or more imaginative ideas and when the individual takes an action based on the imaginative idea, the action may be designated as a creative one based on external (e.g., societal) factors such as, without limitation, feasibility, practicality, originality, or utility; the implementation of a creative idea may be referred to as "innovation." In one embodiment, the methods and systems described herein will provide a measurement benchmark for businesses and schools that seek to improve imagination and creativity and to assess enhancing practices. In another embodiment, the methods and systems described herein will provide functionality for assessing an individual's imagination to understand the fecundity of the mind: how likely is this individual to generate a creative idea that can be shaped into innovation, to envision outcomes and alternative paths.

Figure 1A:
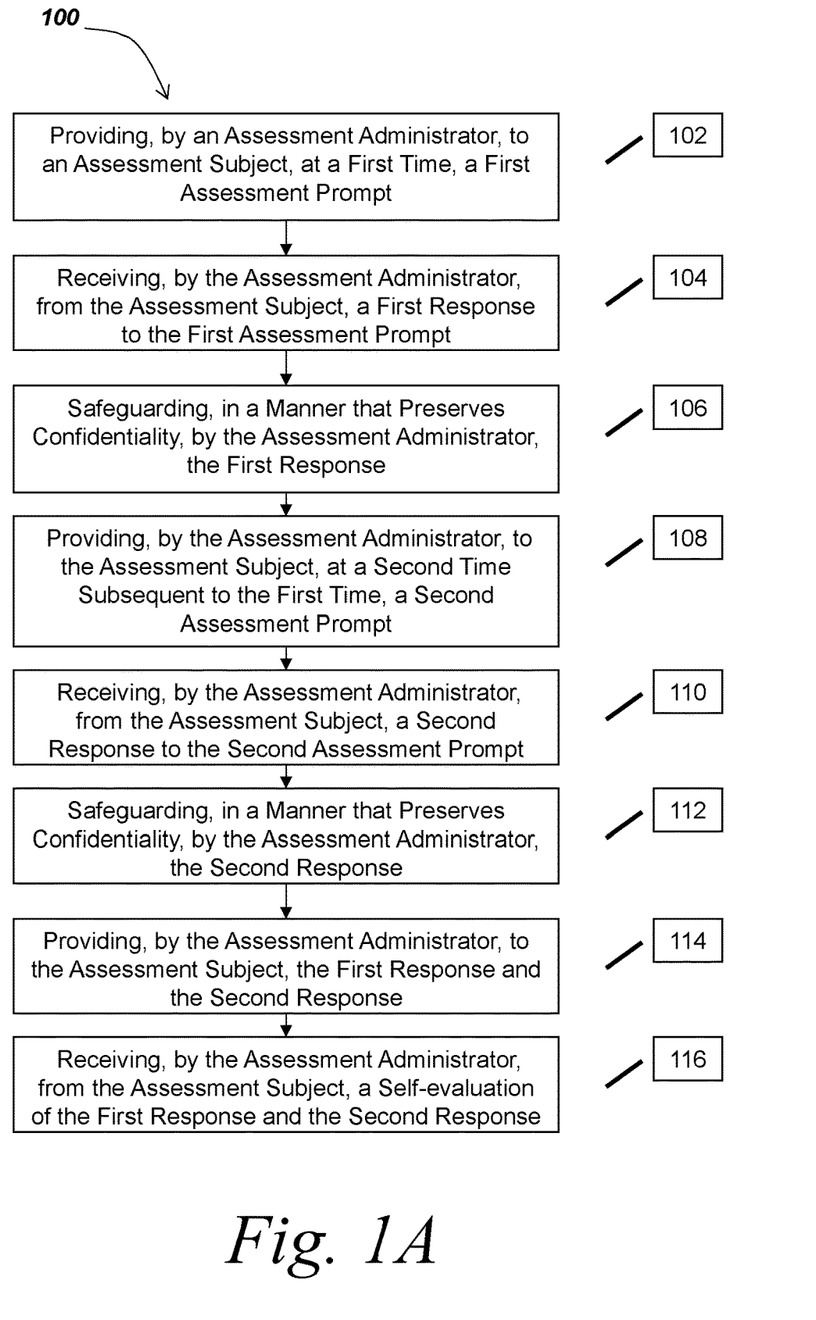
FIG. 1A is a flow diagram depicting an embodiment of a method for self-assessment of imagination.

Referring now to FIG. 1A, a flow diagram depicts one embodiment of a method 100 for assessing imagination. The method 100 includes providing, by an assessment administrator, to an assessment subject, at a first time, a first assessment prompt (102). The method 100 includes receiving, by the assessment administrator, from the assessment subject, a first response to the first assessment prompt (104). The method 100 includes safeguarding, in a manner that preserves confidentiality, by the assessment administrator, the first response (106). The method 100 includes providing, by the assessment administrator, to the assessment subject, at a second time subsequent to the first time, a second assessment prompt (108). The method 100 includes receiving, by the assessment administrator, from the assessment subject, a second response to the second assessment prompt (110). The method 100 includes safeguarding, in a manner that preserves confidentiality, by the assessment administrator, the second response (112). The method 100 includes providing, by the assessment administrator, to the assessment subject, the first response and the second response (114). The method 100 includes receiving, by the assessment administrator, from the assessment subject, a self-evaluation of the first response and the second response (116).

Referring now to FIG. 1A, and in greater detail, the method 100 includes providing, by an assessment administrator, to an assessment subject, at a first time, a first assessment prompt (102). In one embodiment, the assessment process includes providing an assessment subject with an assessment prompt periodically during an assessment period.

In one embodiment, the assessment administrator is a human. In another embodiment, the assessment administrator is a computing device. In still another embodiment, the assessment administrator is a member of an entity with which the assessment subject is affiliated (e.g., the assessment administrator is a teacher at a school where the assessment subject is a student or a manager or other employee of a company for which the assessment subject works). In yet another embodiment, the assessment administrator is affiliated with a third party (e.g., a contractor hired by a school or company with which the assessment subject is affiliated).

In some embodiments, the assessment administrator informs the assessment subject that a response to the assessment prompt will be kept confidential. In other embodiments, the assessment administrator informs the assessment subject that the assessment process will be repeated periodically (for example, without limitation, the assessment process may be repeated once a week for 4-6 weeks; as another example, the assessment process may be repeated every few days). As will be understood by one of ordinary skill, the assessment administrator may repeat the assessment periodically with a number of different prompts, and the number of prompts and the time in the period may be vary based on specifications provided by the assessment administrator. In one of these embodiments, by informing the assessment subject that the assessment process will be repeated, the methods described herein encourage the assessment subject to practice using their imagination in the interim and allows time for the subject's ideas to incubate.

In one embodiment, the assessment prompt asks the assessment subject to write down a number of items the assessment subject would like to do, make, or achieve; the assessment prompt may specify a number (such as 1, 2, 3 or more, or any other amount specified by the assessment administrator) or range of numbers. In another embodiment, the assessment prompt specifies that the items written down should be feasible ideas. In still another embodiment, the assessment prompt specifies that the items written down should be fantastical ideas. In another embodiment, the assessment prompt specifies that the items written down should include both feasible and fantastical ideas. In still another embodiment, the assessment prompt specifies that the assessment subject may include one or more drawings in the response to the prompt. In yet another embodiment, the assessment prompt asks the assessment subject to explain what appeals to her about the items.

In some embodiments, the assessment subject is given a limited amount of time in which to respond to the assessment prompt. By way of example, without limitation, the assessment period may be limited to 6-8 minutes, 10-15 minutes, or any other time period specified by the assessment administrator.

Although described above as a response to the assessment prompt that the assessment subject wrote down, one of ordinary skill in the art will understand that the assessment prompt may be presented to the assessment subject in any of a variety of formats. For example, the assessment subject may be asked to use a computing device to access the assessment prompt either directly or via an Internet protocol (IP) connection to a second computing device. As another example, the assessment subject may receive the assessment prompt in an electronic mail (e-mail) message sent from a computing device associated with the assessment administrator to a computing device associated with the assessment subject. As an additional example, the assessment subject may receive the assessment prompt in a text message sent according to a short message service (SMS) protocol.

The method 100 includes receiving, by the assessment administrator, from the assessment subject, a first response to the first assessment prompt (104). In embodiments in which the assessment prompt and response are paper-based, the assessment subject may seal the response in an envelope. In embodiments in which the assessment prompt and response are paper-based, but the assessment administrator and the assessment subject are in different physical locations, the assessment subject may seal the response in an envelope and mail the envelope to the assessment administrator.

The method 100 includes safeguarding, in a manner that preserves confidentiality, by the assessment administrator, the first response (106). In an embodiment in which the response is paper-based, the assessment administrator may keep the response in a secure physical container (e.g., lock box, safe, locked file cabinet, sealed envelope, etc.). In an embodiment in which the response is computer-based or otherwise electronically prepared, the assessment administrator may secure the electronic file containing the response (e.g., by password protecting file, encrypting the file, etc.). In another embodiment, the assessment administrator ensures the confidentiality of the first response.

The method 100 includes providing, by the assessment administrator, to the assessment subject, at a second time subsequent to the first time, a second assessment prompt (108). In one embodiment, the assessment administrator provides the second assessment prompt as described above in connection with (102).

The method 100 includes receiving, by the assessment administrator, from the assessment subject, a second response to the second assessment prompt (110). In one embodiment, the second response is received as described above in connection with (104).

The method 100 includes safeguarding, in a manner that preserves confidentiality, by the assessment administrator, the second response (112). In one embodiment, the second response is safeguarded as described above in connection with (106).

The method 100 includes providing, by the assessment administrator, to the assessment subject, the first response and the second response (114). In one embodiment, after the assessment period (e.g., 4-6 weeks within which the assessment subject received a plurality of assessment prompts), the assessment administrator returns the responses to the subject. In some embodiments, the assessment administrator and the assessment subject meet in person for the assessment administrator to return the responses. In other embodiments, the assessment administrator returns the responses via electronic communication.

In some embodiments, when providing the first response and the second response, the assessment administrator also provides guidance for performing an evaluation of the responses. In one of these embodiments, the assessment administrator provides an evaluation form to the assessment subject, with which the assessment subject can rate each of the responses (e.g., based on how engaging the ideas are to the assessment subject, or the likelihood of implementation, at the time of the evaluation). For example, and without limitation, the evaluation may provide a simple scale (e.g., from 1-10) asking the assessment subject to rate each item described in each response.

Figure 1B:
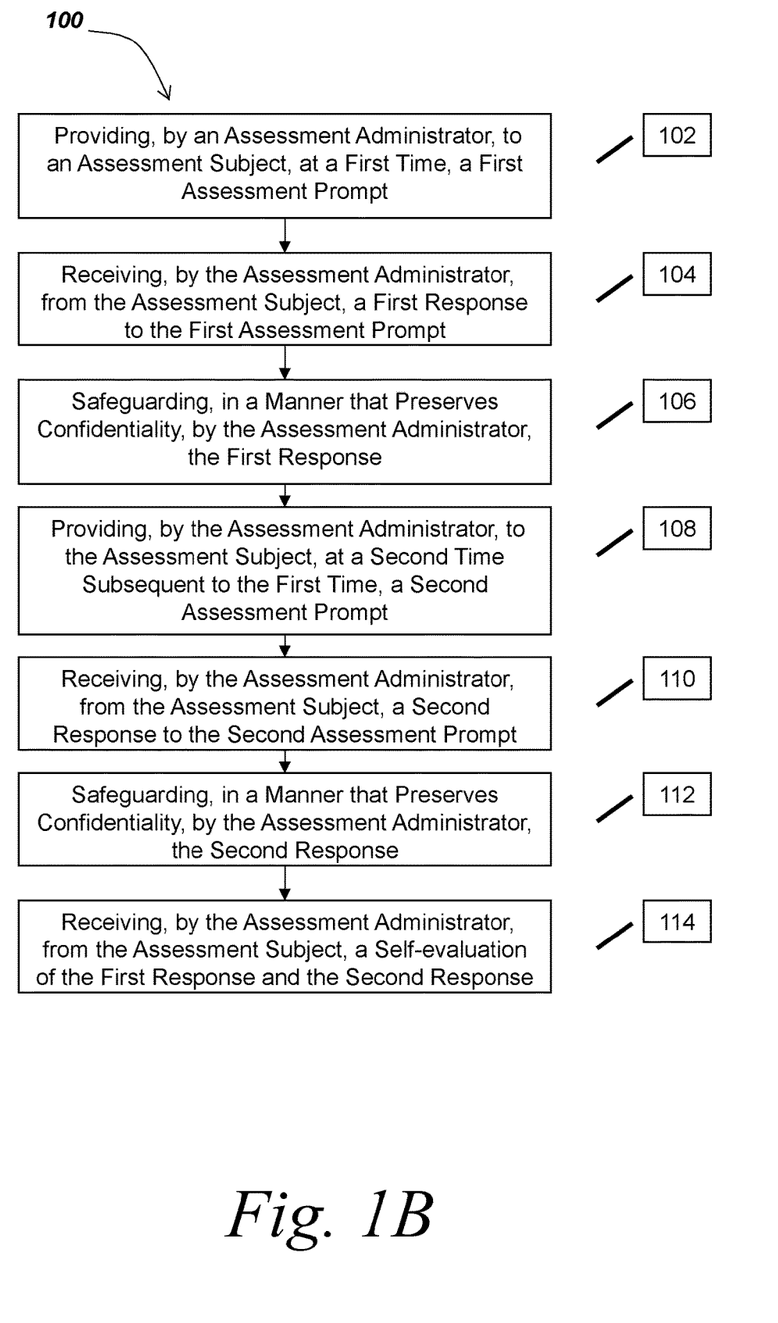
FIG. 1B is a flow diagram depicting an embodiment of a method for self-assessment of imagination.

In some embodiments, providing, by the assessment administrator, to the assessment subject, the first response and the second response, as discussed in connection with FIG. 1 (114) above, is optional. Referring ahead to FIG. 1B, a flow diagram depicts one embodiment of a method 100 for assessing imagination. The method 100 includes providing, by an assessment administrator, to an assessment subject, at a first time, a first assessment prompt (102). In one embodiment, providing, by the assessment administrator, to the assessment subject, at the first time, the first assessment prompt occurs as described above in connection with FIG. 1A (102). The method 100 includes receiving, by the assessment administrator, from the assessment subject, a first response to the first assessment prompt (104). In one embodiment, receiving the first response occurs as described above in connection with FIG. 1A (104). The method 100 includes safeguarding, in a manner that preserves confidentiality, by the assessment administrator, the first response (106). In one embodiment, the safeguarding occurs as described above in connection with FIG. 1A (106). The method 100 includes providing, by the assessment administrator, to the assessment subject, at a second time subsequent to the first time, a second assessment prompt (108). In one embodiment, providing the second assessment prompt at the second time occurs as described above in connection with FIG. 1A (108). The method 100 includes receiving, by the assessment administrator, from the assessment subject, a second response to the second assessment prompt (110). In one embodiment, receiving the second response occurs as described above in connection with FIG. 1A (110). The method 100 includes safeguarding, in a manner that preserves confidentiality, by the assessment administrator, the second response (112). In one embodiment, the safeguarding occurs as described above in connection with FIG. 1A (112). The method 100 includes receiving, by the assessment administrator, from the assessment subject, a self-evaluation of the first response and the second response (114). In one embodiment, receiving the self-evaluation occurs as described above in connection with FIG. 1A (116). Such a method makes the provisioning of the first response and the second response prior to receiving the self-evaluation optional.

Referring again to FIG. 1A, the method 100 includes receiving, by the assessment administrator, from the assessment subject, a self-evaluation of the first response and the second response (116). In one embodiment, the assessment administrator receives the self-evaluation as described above in connection with (104) and receiving responses.

In some embodiments, the assessment administrator also provides an evaluation to a third-party evaluator. The third-party evaluator may be someone associated with the assessment subject (e.g., a teacher, co-worker, peer, mentor, fellow student, etc.). The evaluation may provide the third-party evaluator with means for maintaining anonymity while also providing feedback on the assessment subject's responses (e.g., to serve as a check on self-inflated scores).

Evaluations for both the assessment subject and the third-party evaluator may include questions to guide the respondent. For example, and without limitation, questions may include: Is she still engaged by the ideas? Does she want to pursue any of them? How did her ideation change over the weeks? Was it hard to do? Did it get easier or harder over the time period? How likely is she to implement or test her ideas?

In one embodiment, an assessment subject herein is assessing her own imagination, the mental activities within herself. Unlike tests that compare to a norm, the assessment subject is the norm. She may determine the value of her own imagination at one point in time and how it evolves. Each individual is essentially designing her own "test." Each individual engages with her own curiosity, her own passions, through the process of responding to the assessment prompts. How her ideas fit her own life (e.g., passions) may serve as an indicator of how well the person will be able to generate ideas of social benefit or grow into her creative potential.

One benefit for the assessment subject is that because the assessment period is not a "test" that says some people are creative and some are not, the potential for growth and improvement remains—in contrast with a situation where a test result indicates that a person has little creativity, which may become a self-fulfilling prophecy.

The assessment described herein, therefore, is an assessment of individual imagination while also allowing the participants to begin a creative process that they can continue to explore throughout and after the assessment period. Through the assessment and elapse of time, participants engage in the practice of generating ideas, evaluating them for appeal and feasibility. Furthermore, the assessment itself sends strong messages to participants: that they can (and are expected) to use their own imaginations and are "allowed" to let their imaginations run freely.

In some embodiments, by engaging in the assessment methods described herein, participants will have become active in the illumination and incubation stages of a four-stage creative process that includes preparation, incubation, illumination, and verification. In one embodiment, innovators use thorough knowledge of their domain acquired through preparation to identify good ideas, ideas with the potential to become innovation through verification. Preparation and verification are largely external, open to view and quantification. But the variable, unpredictable and even chaotic tumult of the imagination has previously remained unquantifiable, elusive and mysterious. However, the assessment described herein can be replicated inexpensively over and over, it can be applied with equal results to children and adults, or to white-collar and blue-collar workers; it can function in any language and can be applied across cultures.

Frequent repetition across a plurality of subjects may supply scores with which users of the methods and systems described herein may determine ranges, means, averages, and trends. In one embodiment, the use of the assessment described herein enables a third party to evaluate teaching practices to identify which practices support growth of the imagination. In longitudinal studies, the assessment can be compared with student retention, grade point averages, college success, creative achievement, and so on. Additionally, teachers can build on student ideas for projects, activities and tasks—working on their own ideas increases student engagement, interest and passion. Teachers can also follow up by asking students how they might implement their own ideas, what do they need to know, what steps are necessary and would they like to begin to implement one of their ideas.

For schools, the assessment can provide an accountability that augments the scope of existing measures. By way of example, some environments apply innovation indices as a vehicle designed to ensure that schools teach, foster and promote skills that develop creativity and provide public accountability for that teaching, as well as to equip individuals with the creative skills necessary for individual success. Creativity—the skill that develops imaginative insights and ideas that lead to innovation—is improved by practice. Therefore, the measurement of practice—exercise, opportunities and time—becomes a measurement of creativity by assessing teaching practice rather than testing outcomes. By measuring student activities and behaviors and allowing students to practice the creative skills that lead to innovation, student creativity may increase. Students will also learn that mastery of content—preparation in the domain—is necessary for successful innovation. Applying such innovation indices in conjunction with the imagination assessment described above provides a more robust assessment of an individual and of the resources and/or opportunities needed to encourage improvement of imaginative and creative processes.

Figure 2:
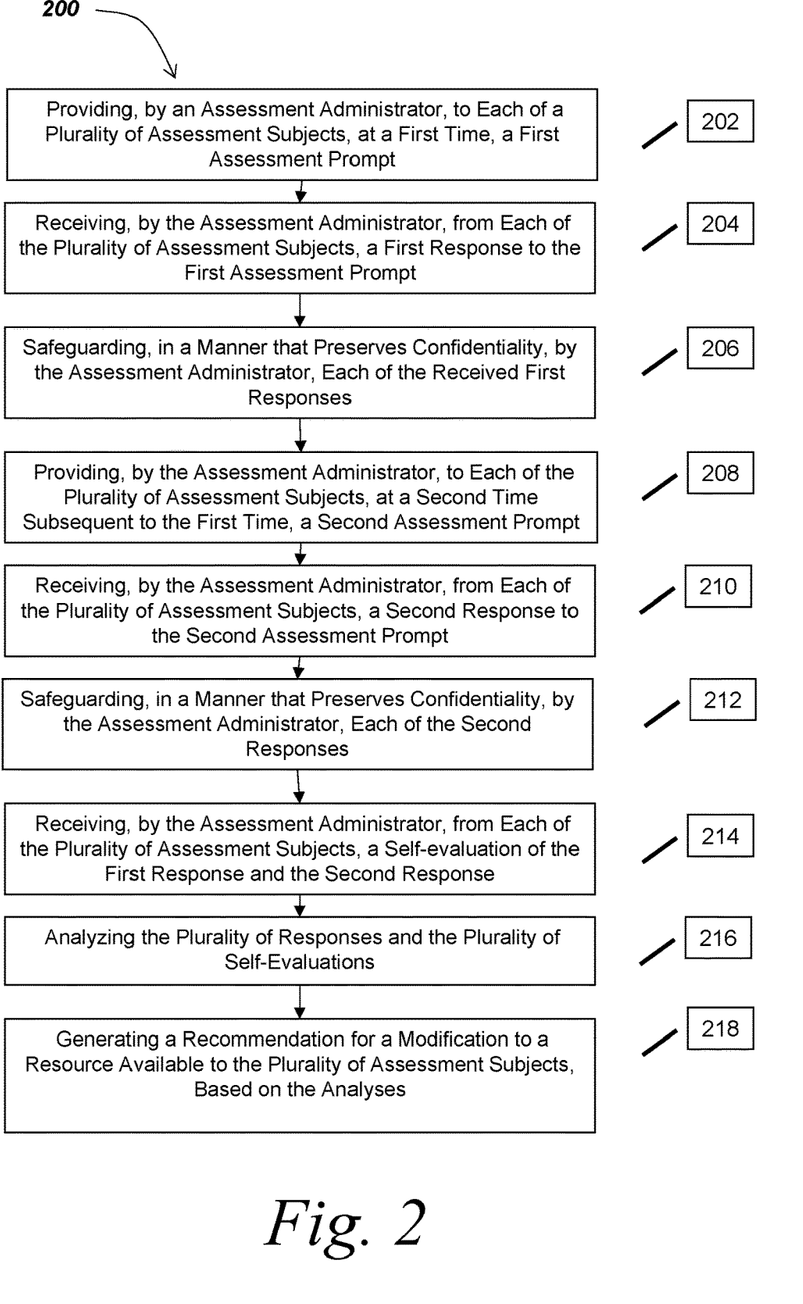
FIG. 2 is a flow diagram depicting an embodiment of a method for generating a recommendation for a modification to a resource available to a plurality of assessment subjects, based on analysis of a plurality of self-assessments of imagination by the plurality of assessment subjects.

Referring now to FIG. 2, a flow diagram depicts one embodiment of a method 200 for generating a recommendation for a modification to a resource available to a plurality of assessment subjects, based on analysis of a plurality of self-assessments of imagination by the plurality of assessment subjects. The method 200 includes providing, by an assessment administrator, to each of a plurality of assessment subjects, at a first time, a first assessment prompt (202). In one embodiment, providing the first assessment prompt occurs as described above in connection with FIG. 1A (102). The method 200 includes receiving, by the assessment administrator, from each of the plurality of assessment subjects, a first response to the first assessment prompt (204). In one embodiment, receiving the first response occurs as described above in connection with FIG. 1A (104). The method 200 includes safeguarding, in a manner that preserves confidentiality, by the assessment administrator, each of the received first responses (206). In one embodiment, the safeguarding occurs as described above in connection with FIG. 1A (106). The method 200 includes providing, by the assessment administrator, to each of the plurality of assessment subjects, at a second time subsequent to the first time, a second assessment prompt (208). In one embodiment, providing the second assessment prompt at the second time occurs as described above in connection with FIG. 1A (108). The method includes 200 receiving, by the assessment administrator, from each of the plurality of assessment subjects, a second response to the second assessment prompt (210). In one embodiment, receiving the second response occurs as described above in connection with FIG. 1A (110). The method 200 includes safeguarding, in a manner that preserves confidentiality, by the assessment administrator, each of the second responses (212). In one embodiment, the safeguarding occurs as described above in connection with FIG. 1A (112). The method 200 includes receiving, by the assessment administrator, from each of the plurality of assessment subjects, a self-evaluation of the first response and the second response (214). In one embodiment, receiving the self-evaluation occurs as described above in connection with FIG. 1A (116).

The method 200 includes analyzing the plurality of responses and the plurality of self-evaluations (216). In one embodiment, the assessment administrator analyzes the plurality of responses and the plurality of self-evaluations. In another embodiment, a computing device analyzes the plurality of responses and the plurality of self-evaluations.

The method 200 includes generating a recommendation for a modification to a resource available to the plurality of assessment subjects, based on the analyses (218). In one embodiment, the assessment administrator generates the recommendations. In another embodiment, a computing device 400 generates the recommendations, as described below. In some embodiments, the data generated by implementation and execution of the assessment methods described herein may assist schools in identifying teaching methods and programs that improve imagination and ideation. By way of example, analysis of the generated data may help determine whether particular programs (e.g., arts education) improve creativity. As another example, analysis of the generated data may help determine how important other programs (e.g., reading) are for developing imagination. As a further example, analysis of the generated data may help determine a level of impact that particular techniques (e.g., project-based learning) have on imagination. These issues may be cost-effectively studied over a sample group that may include hundreds or thousands of students and increasing the sample size may increase the validity of the research. Many education programs claim to enhance creativity and/or imagination. In some embodiments, the assessment methods described herein provide functionality for measuring that success or failure.

In non-academic settings, the statistics derived from a plurality of responses across a plurality of subjects may allow businesses to gauge, for example, current imagination strengths in a workforce as they seek a competitive edge.

Figure 3:
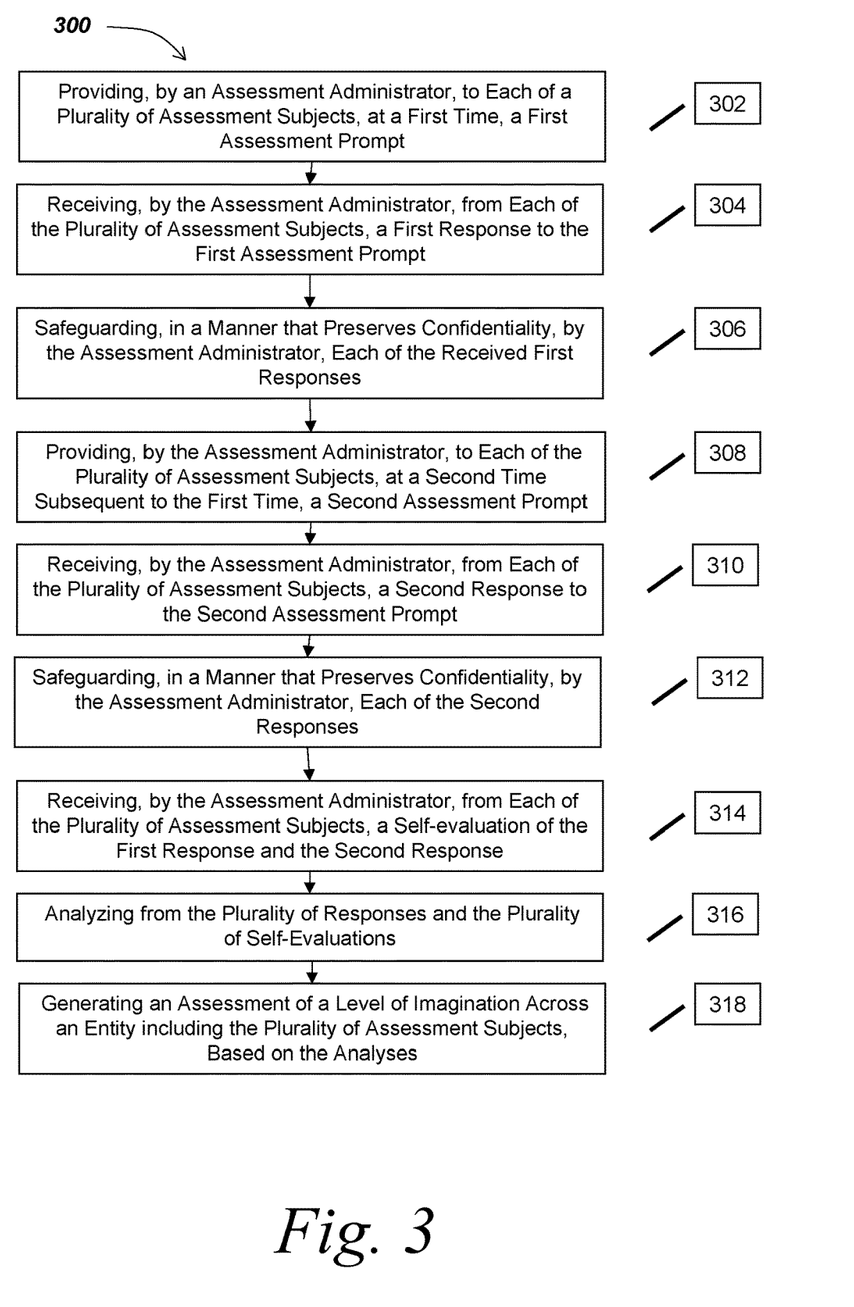
FIG. 3 is a flow diagram depicting an embodiment of a method for generating an assessment of a level of imagination across an entity including a plurality of assessment subjects, based on analysis of a plurality of self-assessments of imagination by the plurality of assessment subjects.

Referring now to FIG. 3, a flow diagram depicting an embodiment of a method 300 for generating an assessment of a level of imagination across an entity including a plurality of assessment subjects, based on analysis of a plurality of self-assessments of imagination by the plurality of assessment subjects. The method 300 includes providing, by an assessment administrator, to each of a plurality of assessment subjects, at a first time, a first assessment prompt (302). In one embodiment, providing the first assessment prompt occurs as described above in connection with FIG. 1A (102). The method 300 includes receiving, by the assessment administrator, from each of the plurality of assessment subjects, a first response to the first assessment prompt (304). In one embodiment, receiving the first response occurs as described above in connection with FIG. 1A (104). The method 300 includes safeguarding, in a manner that preserves confidentiality, by the assessment administrator, each of the received first responses (306). In one embodiment, the safeguarding occurs as described above in connection with FIG. 1A (106). The method 300 includes providing, by the assessment administrator, to each of the plurality of assessment subjects, at a second time subsequent to the first time, a second assessment prompt (308). In one embodiment, providing the second assessment prompt at the second time occurs as described above in connection with FIG. 1A (108). The method 300 includes receiving, by the assessment administrator, from each of the plurality of assessment subjects, a second response to the second assessment prompt (310). In one embodiment, receiving the second response occurs as described above in connection with FIG. 1A (110). The method 300 includes safeguarding, in a manner that preserves confidentiality, by the assessment administrator, each of the second responses (312). In one embodiment, the safeguarding occurs as described above in connection with FIG. 1A (112). The method 300 includes receiving, by the assessment administrator, from each of the plurality of assessment subjects, a self-evaluation of the first response and the second response (314). In one embodiment, receiving the self-evaluation occurs as described above in connection with FIG. 1A (116). The method 300 includes analyzing the plurality of responses and the plurality of self-evaluations (316). In one embodiment, the analysis occurs as described above in connection with FIG. 2 (216).

The method 300 includes generating an assessment of a level of imagination across an entity including the plurality of assessment subjects, based on the analyses (318). In one embodiment, the assessment administrator generates the assessment. In another embodiment, a computing device generates the assessment. In some embodiments, the assessment includes averaging the results of the self-evaluations into a single score. In other embodiments, the assessment includes averaging the results of the self-evaluations into a range of scores and correlating the range of scores with a level of imagination.

As an example, without limitation, in some embodiments, the assessment subject responds to nine evaluation questions and one assessment of overall satisfaction with a level of an individual's ideation; the evaluation questions are averaged to compare against the overall satisfaction assessment. The evaluation questions may be examined individually or based on an average of the evaluation questions. The averaged scores may be compared to normative data, particularly as the number of participants increase over time (e.g., as more individuals use the methods and systems described herein). The individual scores may be compared to a number of other scores (averaged or individually) to answer questions such as how the individual compares to others in her school or in her age cohort. The individual score can be compared one to one with time as the variant to answer questions such as how the individual's ideation varies after participating in a training program or curriculum. The assessment can be used to measure the efficacy of an intervention, such as change in a physical environment, increased physical exercise, practicing imagination, or other training program. The assessment may also provide comparisons of growth rates in individuals or cohorts (one to many or one to one over time) to answer questions such as how imagination of fourth graders compares to that of graduating seniors.

The plurality of responses may also result in generation of one or more creative ideas for a company seeking to offer innovative products or services. The derived statistics may also provide a company with means for gauging a level of improvement in a workforce over time. Furthermore, as companies invest in training programs that promise to enhance creativity, the assessment provides a level of accountability. The assessment will also provide a measure of the collective imagination and ideation capacity, which allows a company to determine the likelihood of creativity leading to innovation. By way of example, and without limitation, in a company that has redesigned a workplace to foster creativity, the assessment methods described herein may measure an impact on the imagination and ideation capacity of the company's employees.

In some embodiments, the results of some implementations of the methods described herein may be scientifically validated. By way of example, and without limitation, in studies of the brain, current research shows a correlation between a level of thickness of particular cortical regions of the brain and a level of openness to new experiences. Openness to new experiences may be a factor that influences a level of imagination of an assessment subject. Monitoring a series of self-evaluations by assessment subjects and analyzing statistics derived from the series may demonstrate a correlation between having taken the assessments described herein and modifying the level of thickness of the cortical regions in the brain (and therefore modifying assessment subjects' level of openness to new experiences).

In other embodiments, the assessments described herein may be incorporated into a scientific study. For example, in an embodiment in which a correlation is shown between participation in the assessment methods described herein and a modified level of thickness of a cortical region, scientists may use the assessment methods described herein as a reliable, cost-effective measurement for use in studying individual imagination. The data generated during implementation and execution of the assessment methods described herein may allow scientists to study imagination and creativity across the human experience.

Figure 4A:
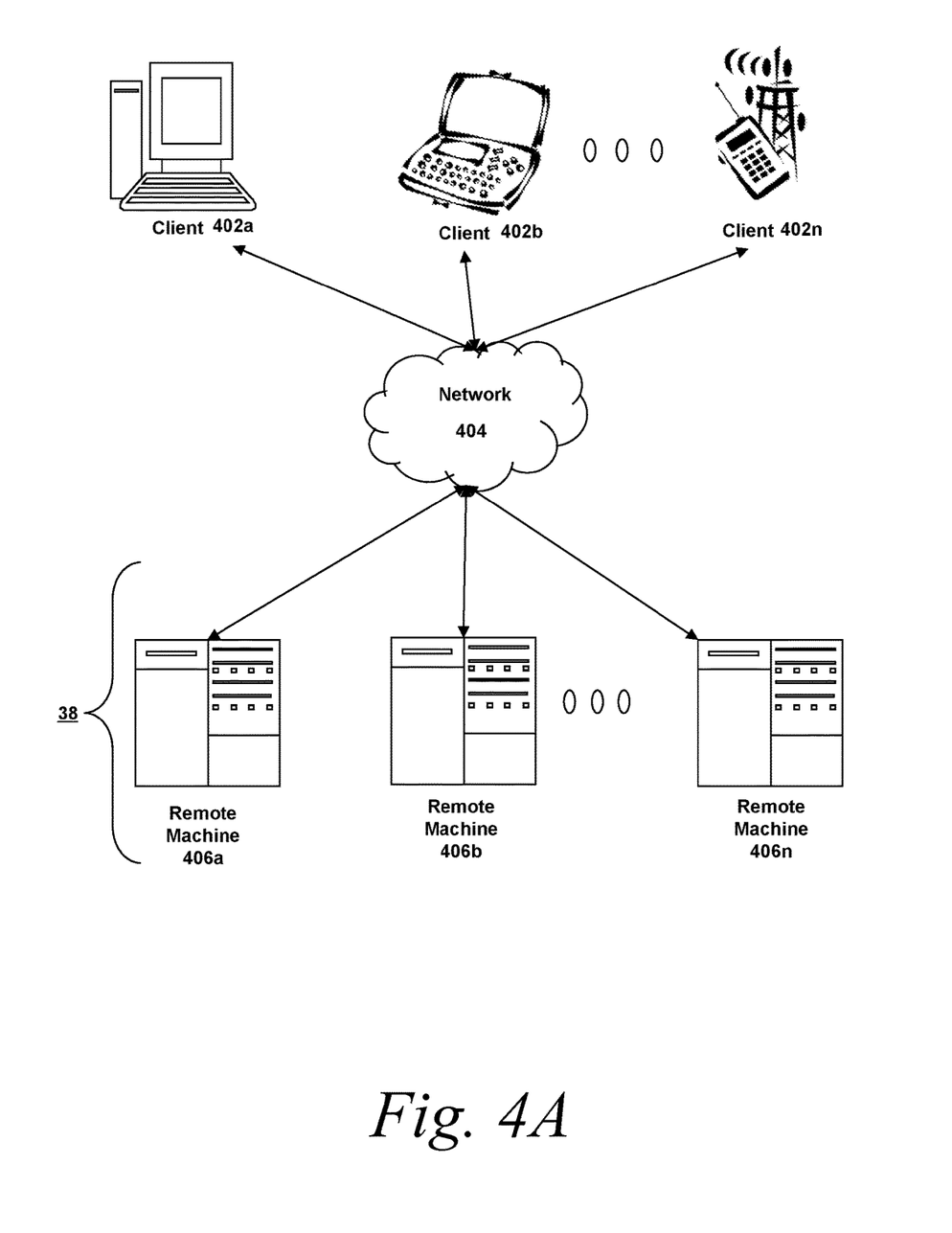
FIGS. 4A-4C are block diagrams depicting embodiments of computers useful in connection with the methods and systems described herein.

Referring now to FIG. 4A, an embodiment of a network environment is depicted. In brief overview, the network environment comprises one or more clients 402a-402n (also generally referred to as local machine(s) 402, client(s) 402, client node(s) 402, client machine(s) 402, client computer(s) 402, client device(s) 402, computing device(s) 402, endpoint(s) 402, or endpoint node(s) 402) in communication with one or more remote machines 406a-406n (also generally referred to as server(s) 406 or computing device(s) 406) via one or more networks 404.

Although FIG. 4A shows a network 404 between the clients 402 and the remote machines 406, the clients 402 and the remote machines 406 may be on the same network 404. The network 404 can be a local area network (LAN), such as a company Intranet, a metropolitan area network (MAN), or a wide area network (WAN), such as the Internet or the World Wide Web. In some embodiments, there are multiple networks 404 between the clients 402 and the remote machines 406. In one of these embodiments, a network 404' (not shown) may be a private network and a network 404 may be a public network. In another of these embodiments, a network 404 may be a private network and a network 404' a public network. In still another embodiment, networks 404 and 404' may both be private networks.

The network 404 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, and a wireline network. In some embodiments, the network 404 may comprise a wireless link, such as an infrared channel or satellite band. The topology of the network 404 may be a bus, star, or ring network topology. The network 404 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 402 and a remote machine 406 (referred to generally as computing devices 400) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 402 may execute, operate or otherwise provide an application, which can be any type and/or form of software, program, or executable instructions, including, without limitation, any type and/or form of web browser, web-based client, client-server application, an ActiveX control, or a JAVA applet, or any other type and/or form of executable instructions capable of executing on client 402.

In one embodiment, a computing device 406 provides functionality of a web server. In some embodiments, a web server 406 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, Wash., the ORACLE IPLANET web server products provided by Oracle Corporation of Redwood Shores, Calif., or the BEA WEBLOGIC products provided by BEA Systems of Santa Clara, Calif.

In some embodiments, the system may include multiple, logically-grouped remote machines 406. In one of these embodiments, the logical group of remote machines may be referred to as a server farm 38. In another of these embodiments, the server farm 38 may be administered as a single entity.

Figure 4B:
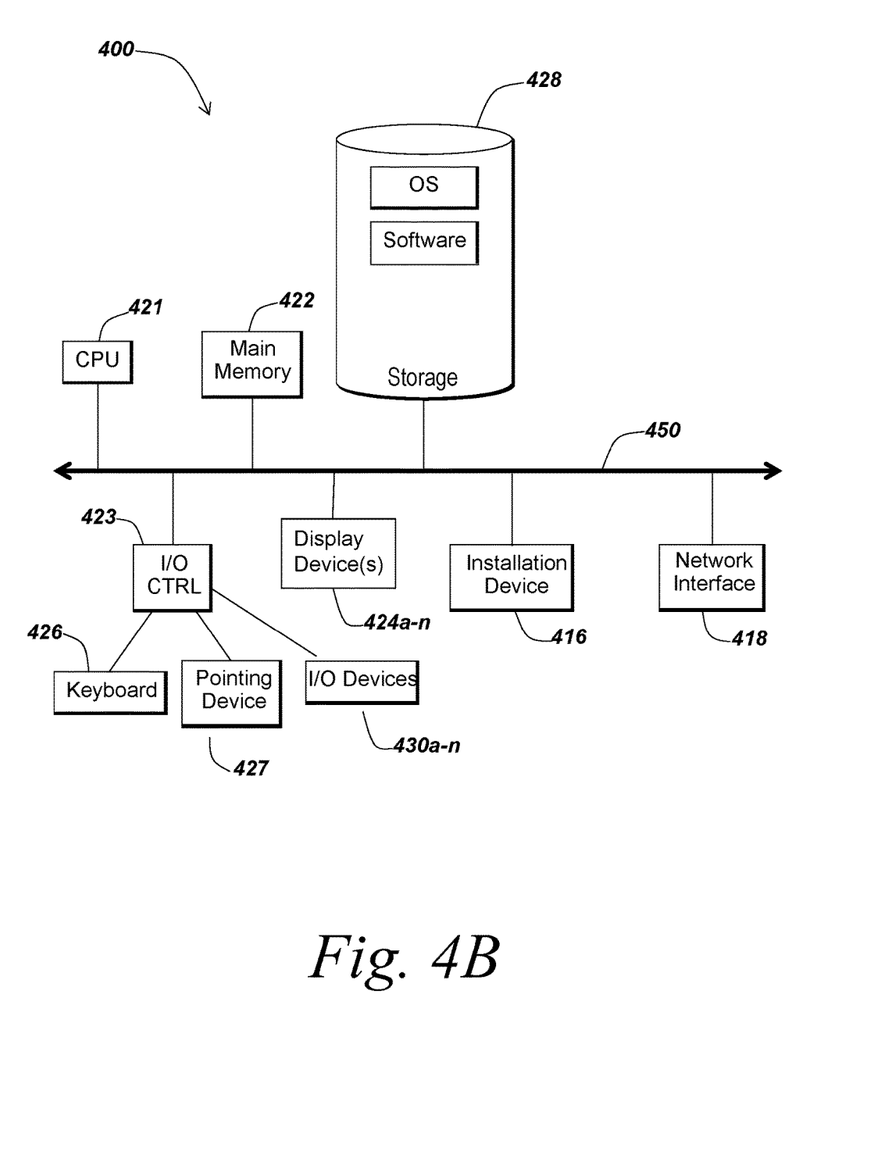
Figure 4C:
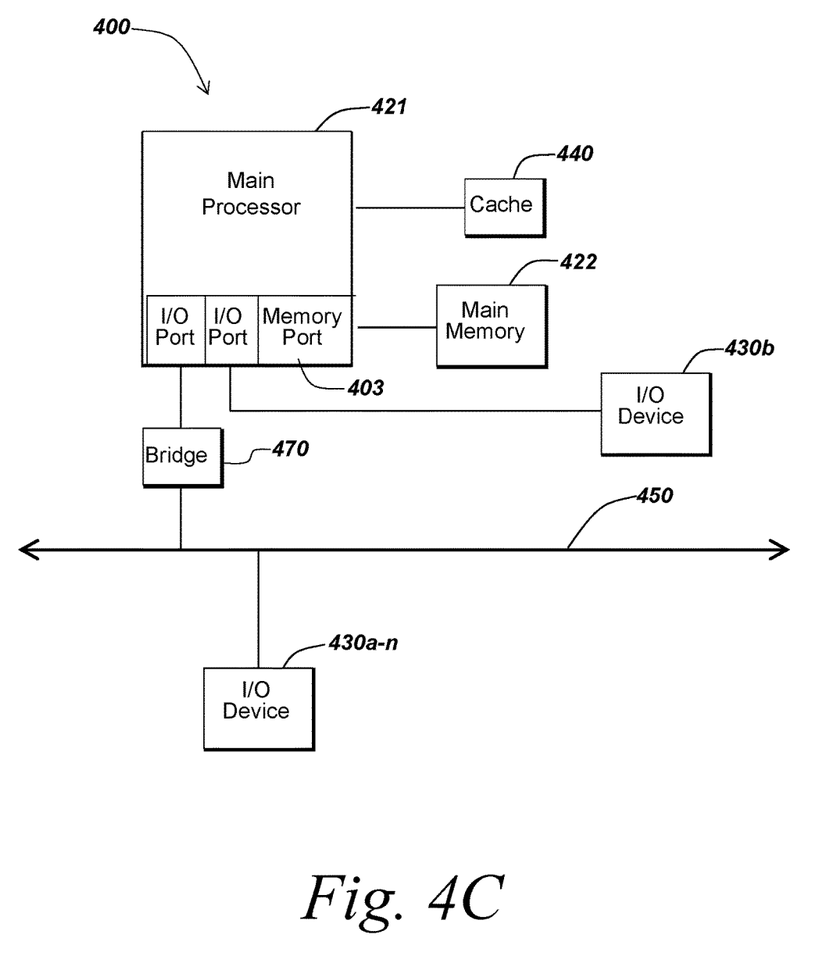

FIGS. 4B and 4C depict block diagrams of a computing device 400 useful for practicing an embodiment of the client 402 or a remote machine 406. As shown in FIGS. 4B and 4C, each computing device 400 includes a central processing unit 421, and a main memory unit 422. As shown in FIG. 4B, a computing device 400 may include a storage device 428, an installation device 416, a network interface 418, an I/O controller 423, display devices 424a-n, a keyboard 426, a pointing device 427, such as a mouse, and one or more other I/O devices 430a-n. The storage device 428 may include, without limitation, an operating system and software. As shown in FIG. 4C, each computing device 400 may also include additional optional elements, such as a memory port 403, a bridge 470, one or more input/output devices 430a-430n (generally referred to using reference numeral 430), and a cache memory 440 in communication with the central processing unit 421.

The central processing unit 421 is any logic circuitry that responds to and processes instructions fetched from the main memory unit 422. In many embodiments, the central processing unit 421 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; those manufactured by International Business Machines of White Plains, N.Y.; or those manufactured by Advanced Micro Devices of Sunnyvale, Calif. Other examples include SPARC processors, ARM processors, processors used to build UNIX/LINUX "white" boxes, and processors for mobile devices. The computing device 400 may be based on any of these processors, or any other processor capable of operating as described herein.

Main memory unit 422 may be one or more memory chips capable of storing data and allowing any storage location to be directly accessed by the microprocessor 421. The main memory 422 may be based on any available memory chips capable of operating as described herein. In the embodiment shown in FIG. 4B, the processor 421 communicates with main memory 422 via a system bus 450. FIG. 4C depicts an embodiment of a computing device 400 in which the processor communicates directly with main memory 422 via a memory port 403. FIG. 4C also depicts an embodiment in which the main processor 421 communicates directly with cache memory 440 via a secondary bus, sometimes referred to as a backside bus. In other embodiments, the main processor 421 communicates with cache memory 440 using the system bus 450.

In the embodiment shown in FIG. 4B, the processor 421 communicates with various I/O devices 430 via a local system bus 450. Various buses may be used to connect the central processing unit 421 to any of the I/O devices 430, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 424, the processor 421 may use an Advanced Graphics Port (AGP) to communicate with the display 424. FIG. 4C depicts an embodiment of a computer 400 in which the main processor 421 also communicates directly with an I/O device 430b via, for example, HYPERTRANSPORT, RAPIDIO, or INFINIBAND communications technology.

A wide variety of I/O devices 430a-430n may be present in the computing device 400. Input devices include keyboards, mice, trackpads, trackballs, microphones, scanners, cameras, and drawing tablets. Output devices include video displays, speakers, inkjet printers, laser printers, and dye-sublimation printers. The I/O devices may be controlled by an I/O controller 423 as shown in FIG. 4B. Furthermore, an I/O device may also provide storage and/or an installation medium 416 for the computing device 400. In some embodiments, the computing device 400 may provide USB connections (not shown) to receive handheld USB storage devices such as the USB Flash Drive line of devices manufactured by Twintech Industry, Inc. of Los Alamitos, Calif.

Referring still to FIG. 4B, the computing device 400 may support any suitable installation device 416, such as a floppy disk drive for receiving floppy disks such as 3.5-inch, 5.25-inch disks or ZIP disks; a CD-ROM drive; a CD-R/RW drive; a DVD-ROM drive; tape drives of various formats; a USB device; a hard-drive or any other device suitable for installing software and programs. In some embodiments, the computing device 400 may provide functionality for installing software over a network 404. The computing device 400 may further comprise a storage device, such as one or more hard disk drives or redundant arrays of independent disks, for storing an operating system and other software. Alternatively, the computing device 400 may rely on memory chips for storage instead of hard disks.

Furthermore, the computing device 400 may include a network interface 418 to interface to the network 404 through a variety of connections including, but not limited to, standard telephone lines, LAN or WAN links (e.g., 802.11, T1, T3, 56kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 400 communicates with other computing devices 400' via any type and/or form of gateway or tunneling protocol such as Secure Socket Layer (SSL) or Transport Layer Security (TLS). The network interface 418 may comprise a built-in network adapter, network interface card, PCMCIA network card, card bus network adapter, wireless network adapter, USB network adapter, modem, or any other device suitable for interfacing the computing device 400 to any type of network capable of communication and performing the operations described herein.

In some embodiments, the computing device 400 may comprise or be connected to multiple display devices 424a-424n, each of which may be of the same or different type and/or form. As such, any of the I/O devices 430a-430n and/or the I/O controller 423 may comprise any type and/or form of suitable hardware, software, or combination of hardware and software to support, enable or provide for the connection and use of multiple display devices 424a-424n by the computing device 400. One ordinarily skilled in the art will recognize and appreciate the various ways and embodiments that a computing device 400 may be configured to have multiple display devices 424a-424n.

In further embodiments, an I/O device 430 may be a bridge between the system bus 450 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 400 of the sort depicted in FIGS. 4B and 4C typically operates under the control of operating systems, which control scheduling of tasks and access to system resources. The computing device 400 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, WINDOWS 8, and WINDOWS VISTA, all of which are manufactured by Microsoft Corporation of Redmond, Wash.; MAC OS manufactured by Apple Inc. of Cupertino, Calif.; OS/2 manufactured by International Business Machines of Armonk, N.Y.; Red Hat Enterprise Linux, a Linus-variant operating system distributed by Red Hat, Inc., of Raleigh, N.C.; Ubuntu, a freely-available operating system distributed by Canonical Ltd. of London, England; or any type and/or form of a UNIX operating system, among others.

The computing device 400 can be any workstation, desktop computer, laptop or notebook computer, server, portable computer, mobile telephone or other portable telecommunication device, media playing device, a gaming system, mobile computing device, or any other type and/or form of computing, telecommunications or media device that is capable of communication and that has sufficient processor power and memory capacity to perform the operations described herein. In some embodiments, the computing device 400 may have different processors, operating systems, and input devices consistent with the device. In other embodiments the computing device 400 is a mobile device, such as a JAVA-enabled cellular telephone/smartphone or personal digital assistant (PDA). The computing device 400 may be a mobile device such as those manufactured, by way of example and without limitation, by Apple Inc. of Cupertino, Calif.; Google/Motorola Div. of Ft. Worth, Tex.; Kyocera of Kyoto, Japan; Samsung Electronics Co., Ltd. of Seoul, Korea; Nokia of Finland; Hewlett-Packard Development Company, L.P. and/or Palm, Inc. of Sunnyvale, Calif.; Sony Ericsson Mobile Communications AB of Lund, Sweden; or Research in Motion Limited of Waterloo, Ontario, Canada. In yet other embodiments, the computing device 400 is a smartphone, POCKET PC, POCKET PC PHONE, or other portable mobile device supporting Microsoft Windows Mobile Software.

In some embodiments, the computing device 400 is a digital audio player. In one of these embodiments, the computing device 400 is a digital audio player such as the Apple IPOD, IPOD TOUCH, IPOD NANO, and IPOD SHUFFLE lines of devices manufactured by Apple Inc. In another of these embodiments, the digital audio player may function as both a portable media player and as a mass storage device. In other embodiments, the computing device 400 is a digital audio player such as those manufactured by, for example, and without limitation, Samsung Electronics America of Ridgefield Park, N.J., or Creative Technologies Ltd. of Singapore. In yet other embodiments, the computing device 400 is a portable media player or digital audio player supporting file formats including, but not limited to, MP3, WAV, M4A/AAC, WMA Protected AAC, AEFF, Audible audiobook, Apple Lossless audio file formats, and .move, .m4v, and .mp4 MPEG-4 (H.264/MPEG-4 AVC) video file formats.

In some embodiments, the computing device 400 comprises a combination of devices, such as a mobile phone combined with a digital audio player or portable media player. In one of these embodiments, the computing device 400 is a device in the Google/Motorola line of combination digital audio players and mobile phones. In another of these embodiments, the computing device 400 is a device in the IPHONE smartphone line of devices manufactured by Apple Inc. In still another of these embodiments, the computing device 400 is a device executing the ANDROID open source mobile phone platform distributed by the Open Handset Alliance; for example, the device 400 may be a device such as those provided by Samsung Electronics of Seoul, Korea, or HTC Headquarters of Taiwan, R.O.C. In other embodiments, the computing device 400 is a tablet device such as, for example and without limitation, the IPAD line of devices manufactured by Apple Inc.; the PLAYBOOK manufactured by Research In Motion; the CRUZ line of devices manufactured by Velocity Micro, Inc. of Richmond, Va.; the FOLIO and THRIVE line of devices manufactured by Toshiba America Information Systems, Inc. of Irvine, Calif.; the GALAXY line of devices manufactured by Samsung; the HP SLATE line of devices manufactured by Hewlett-Packard; and the STREAK line of devices manufactured by Dell, Inc. of Round Rock, Tex. In some embodiments, the methods described above are implemented using one or more computing devices 400.

Figure 5:
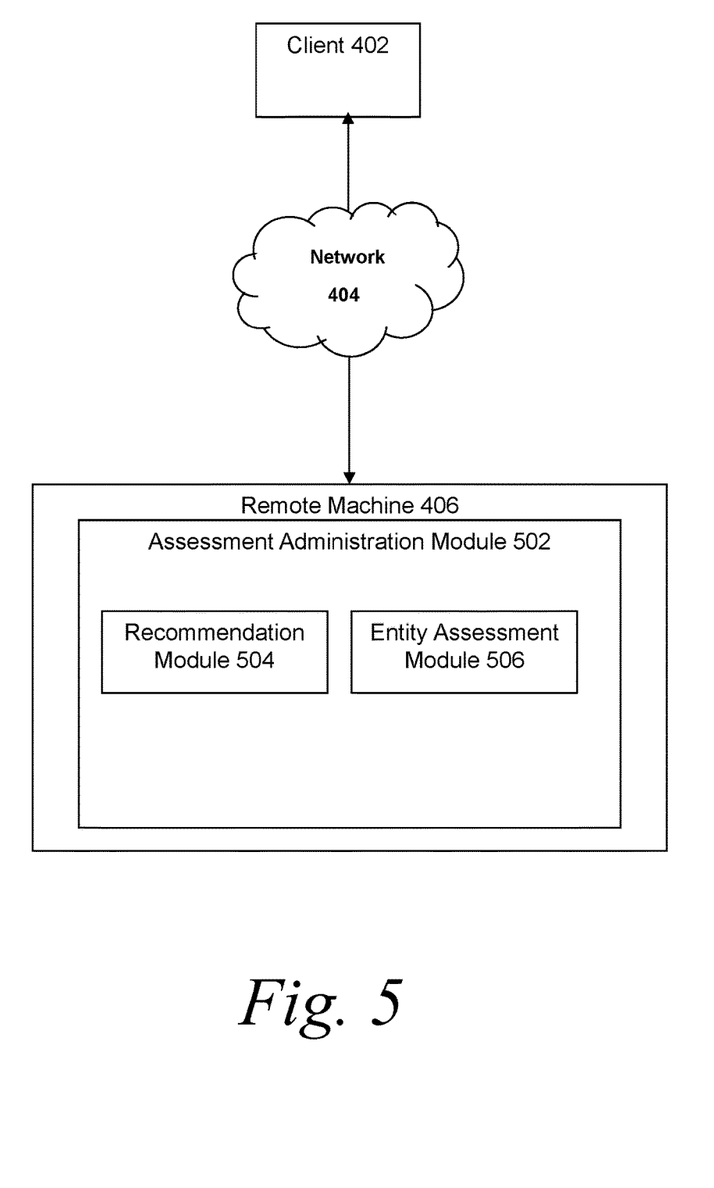
FIG. 5 is a block diagram depicting one embodiment of a system for self-assessment of imagination.

Referring now to FIG. 5, a block diagram depicts one embodiment of a system for self-assessment of imagination. As shown in FIG. 5, the remote machine 406 executes an assessment administration module 502. In some embodiments, the assessment administration module 502 is a software program. In other embodiments, the assessment administration module 502 is a hardware module. The assessment administration module 502 may perform the steps of the methods described above in FIGS. 1A-1C. For example, the assessment administration module 502 may transmit assessment prompts to one or more clients 402 via the network 404. The assessment administration module 502 may receive from one or more clients 402, via the network 404, one or more responses to assessment prompts. The assessment administration module 502 may safeguard received responses, in a manner that preserves confidentiality. For example, the assessment administration module 502 may encrypt a response. The assessment administration module 502 may store received responses in a database (not shown). The assessment administration module 502 may receive, from the assessment subject, one or more self-evaluations. The assessment administration module 502 may include a recommendation module 504 for generating a recommendation for a modification to a resource available to a plurality of assessment subjects, based on analyses of responses and self-evaluations received from the plurality of assessment subjects. The assessment administration module 502 may include an entity assessment module 506 for generating an assessment of a level of imagination across an entity including the plurality of assessment subjects, based on analyses of responses and self-evaluations received from the plurality of assessment subjects.

It should be understood that the systems described above may provide multiple ones of any or each of the described components. The phrases 'in one embodiment,' 'in another embodiment,' and the like, generally mean the particular feature, structure, step, or characteristic following the phrase is included in at least one embodiment of the present disclosure and may be included in more than one embodiment of the present disclosure. Such phrases may, but do not necessarily, refer to the same embodiment.

The systems and methods described above may be implemented as a method, apparatus, or article of manufacture using programming and/or engineering techniques to produce software, firmware, hardware, or any combination thereof The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, or any compiled or interpreted programming language.

Each such computer program may be implemented in a computer program product tangibly embodied in a machine-readable storage device for execution by a computer processor. Method steps of the invention may be performed by a computer processor executing a program tangibly embodied on a computer-readable medium to perform functions of the invention by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices; firmware; programmable logic; hardware (e.g., integrated circuit chip, electronic devices, a computer-readable non-volatile storage unit, non-volatile memory, such as semiconductor memory devices, including EPROM, EEPROM, and flash memory devices); magnetic disks such as internal hard disks and removable disks; magneto-optical disks; and CD-ROMs. Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs and data via a network transmission line, wireless transmission media, signals propagating through space, radio waves, infrared signals, non-transitory computer media, etc.

Having described certain embodiments of methods and systems for assessing imagination and ideation, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A method for determining a level of imagination of an assessment subject, the method comprising:
providing, by an assessment administrator, to an assessment subject, at a first time, a first assessment prompt instructing the assessment subject to write at least one idea;
receiving, by the assessment administrator, from the assessment subject, a first response to the first assessment prompt;
safeguarding, in a manner that preserves confidentiality, by the assessment administrator, the received first response;
providing, by the assessment administrator, to the assessment subject, at a second time subsequent to the first time, a second assessment prompt instructing the assessment subject to write at least one idea;
receiving, by the assessment administrator, from the assessment subject, a second response to the second assessment prompt;
safeguarding, in a manner that preserves confidentiality, by the assessment administrator, the second response;

receiving, by the assessment administrator, from the assessment subject, a self-evaluation of a level of imagination of the assessment subject based on self-evaluation of the first response and the second response;

analyzing the plurality of responses and the self-evaluation to determine a level of imagination, wherein analyzing comprises averaging the results of the self-assessment into a single score;

correlating the score to a thickness of a cortical region of the brain of the assessment subject; and providing a measurement of the level of individual imagination based upon the correlation.

2. The method of claim 1, wherein generating further comprises generating a recommendation for a modification to a teaching practice applied to the plurality of assessment subjects, based on the analyses.

3. The method of claim 1, wherein generating further comprises generating a recommendation for a modification to a level of investment in a training program accessible by the plurality of assessment subjects, based on the analyses.

* * * * *

UNITED STATES PATENT AND TRADEMARK OFFICE
CERTIFICATE OF CORRECTION

PATENT NO. : 10,482,782 B2  
APPLICATION NO. : 16/036370  
DATED : November 19, 2019  
INVENTOR(S) : Daniel Rhodes Hunter It is certified that error appears in the above-identified patent and that said Letters Patent is hereby corrected as shown below:

On the Title Page

In Item (56), under "OTHER PUBLICATIONS", in Column 2, Line 2, delete "Test" The" and insert -- Test," The --, therefor.

In Item (56), under "OTHER PUBLICATIONS", in Column 2, Line 3, delete "Psycholocy" and insert -- Psychology --, therefor.

In the Drawings

In Sheet 7 of 8, FIG. 4C, for Tag "430-n" delete "I/O Device" and insert -- I/O Devices --, therefor.

In the Specification

In Column 12, Line 6, delete "microprocessor" and insert -- main processor --, therefor.

In Column 12, Line 29, delete "computer 400" and insert -- computing device 400 --, therefor.

In Column 12, Line 41, delete "medium 416" and insert -- device 416 --, therefor.

In Column 14, Line 55, delete "device 400" and insert -- computing device 400 --, therefor.

Signed and Sealed this  
Eighteenth Day of February, 2020

Andrei Iancu  
*Director of the United States Patent and Trademark Office*